(No Model.)
H. T. SEELEY.
TWO WHEELED VEHICLE.
No. 275,084. Patented Apr. 3, 1883.
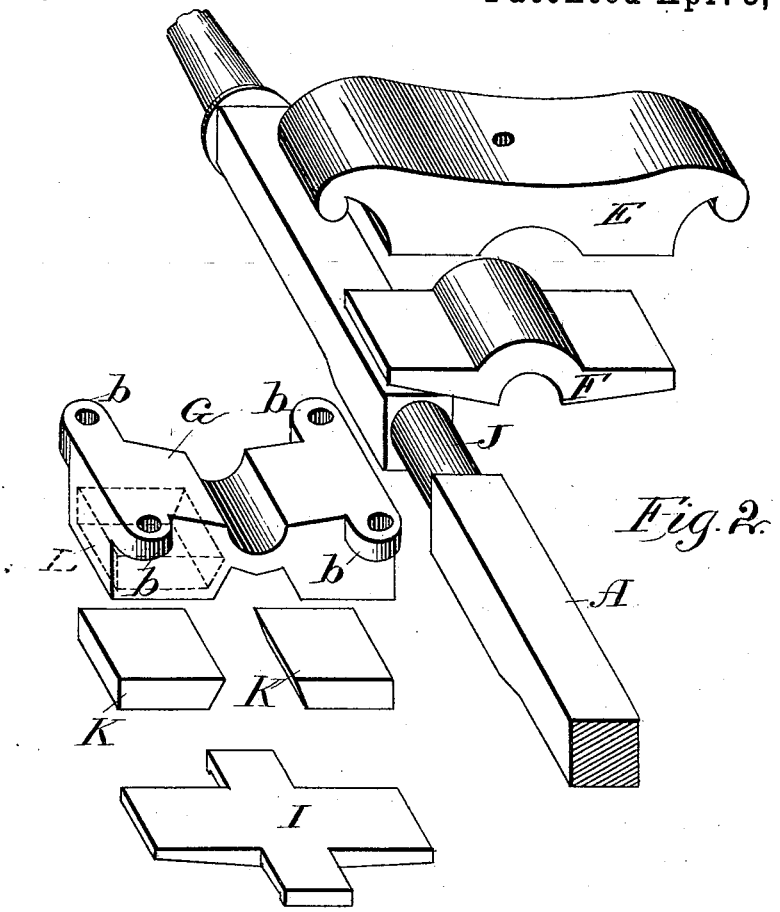
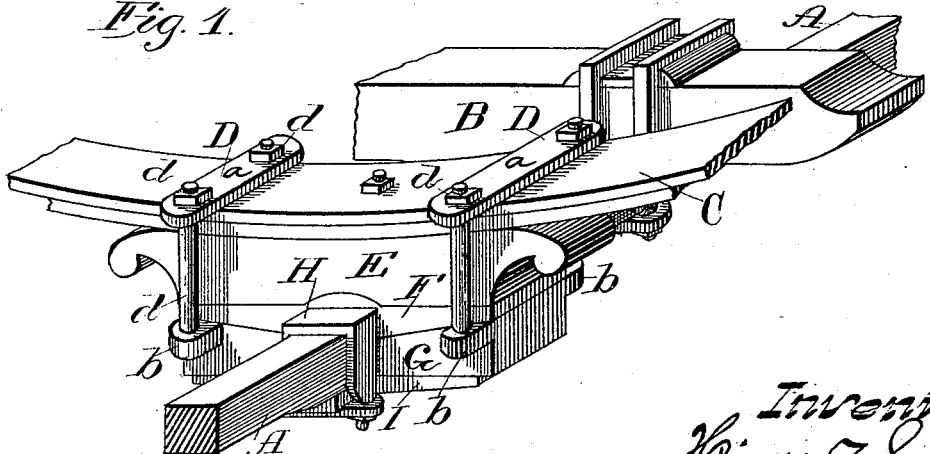
Witnesses:
E. G. Asmus
Wm. J. Sinnott
Inventor:
Hiram T. Seeley
By Jas. B. Emira
Attorney

UNITED STATES PATENT OFFICE.

HIRAM T. SEELEY, OF SHEBOYGAN FALLS, WISCONSIN.

TWO-WHEELED VEHICLE.

SPECIFICATION forming part of Letters Patent No. 275,084, dated April 3, 1883.

Application filed January 8, 1883. (No model.)

*To all whom it may concern:*

Be it known that I, HIRAM T. SEELEY, a citizen of the United States, residing at Sheboygan Falls, in the county of Sheboygan and State of Wisconsin, have invented certain new and useful Improvements in Two-Wheeled Vehicles; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to improvements in two-wheeled vehicles.

The object of my improvements is to prevent the unpleasant oscillating or jerking motion caused by the upward and downward movement of a horse, when trotting, from being communicated to the seat or body of the carriage; and it consists in a yielding coupling device for connecting either the thills or springs to the axle, whereby the movement of the horse is prevented from being transmitted to the body of the carriage.

The construction of my invention is further explained by reference to the accompanying drawings, in which—

Figure 1 represents a perspective view of my invention, showing a portion of the spring and axle to which it is attached broken away. Fig. 2 represents a perspective view of the several parts detached from each other.

Like parts are represented by the same reference-letters in both views.

A is the axle.

B represents that part of one of the thills which is attached to the axle.

C represents a section of one of the springs, there being another spring and thill and coupling device attached in like manner at the opposite end of the axle upon which the carriage-body is supported, and duplicates of all the parts hereinafter mentioned for attaching the spring shown are in like manner connected with the other spring.

The spring is connected to the axle by clasps D D, block E, boxes F and G, clasp H, and plate I. The clasps D respectively consist in plates $a\ a\ b\ b$ and bolts $d\ d\ d\ d$.

The thills being rigidly attached to the axle, the axle is caused to turn slightly as the front ends of the thills rise and fall with the movement of the horse.

To prevent the turning movement of the axle from being communicated to the springs and body of the carriage, the axle is rounded at J, and blocks of rubber, or other elastic cushions, K K, are interposed between the boxes G and plate I, which cushions yield sufficiently to permit of the slight turning of the boxes on the rounded part of the axle, whereby the body remains at rest while the axle turns, as mentioned.

The under side of the box G is provided with recesses L L for the reception of the cushions K K.

The spring C, block E, and boxes F and G are firmly drawn together around the rounded part of the axle J by the clasps D D. When the parts are thus secured they are prevented from turning around on the axle, except a slight distance, as mentioned, by the plate I, clasp H, and elastic cushions K K; the clasp H and plate I being rigidly bolted to the axle, so that they cannot turn except with the axle, while the elastic cushions are interposed between the rigid plate I and the movable box G in such a manner that they yield to the action of the plate I and axle without transmitting motion from the axle to the boxes F and G and the parts connected rigidly thereto, whereby the springs and body supported thereon are relieved of the rocking motion to which the body of two-wheeled vehicles are ordinarily subjected.

If desired, the springs may be rigidly fastened to the axle in the ordinary manner, and the thills may be attached by the yielding coupling device described, the effect being the same upon the body of the carriage.

Having thus described my invention, what I claim as new, and desire to secure by Letters Patent, is—

A yielding coupling device for attaching the springs or thills of two-wheeled vehicles to the axle, said device consisting of the parts rigidly attached to the thills or springs, parts rigidly attached to the axle, and yielding cushions interposed between such parts, whereby the upward and downward movement of the horse is prevented by such yielding cushions from being transmitted to the body of the carriage, substantially as and for the purpose specified.

In testimony whereof I affix my signature in presence of two witnesses.

HIRAM T. SEELEY.

Witnesses:
JNO. E. THOMAS,
FRANK CHAMBERLIN.